Patented July 28, 1942

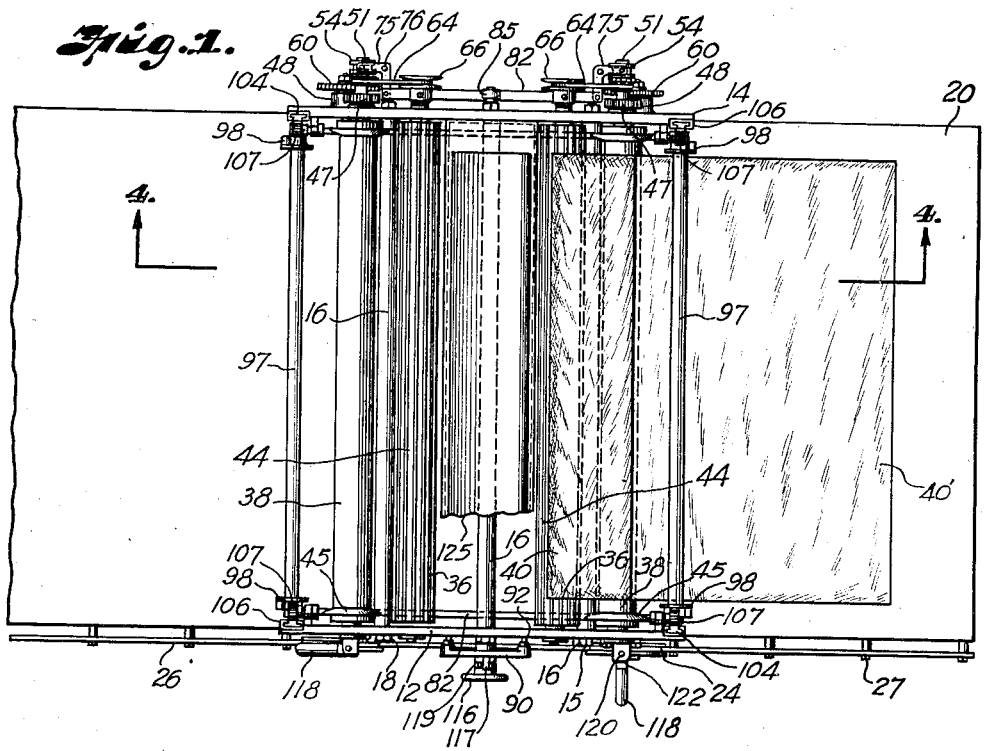
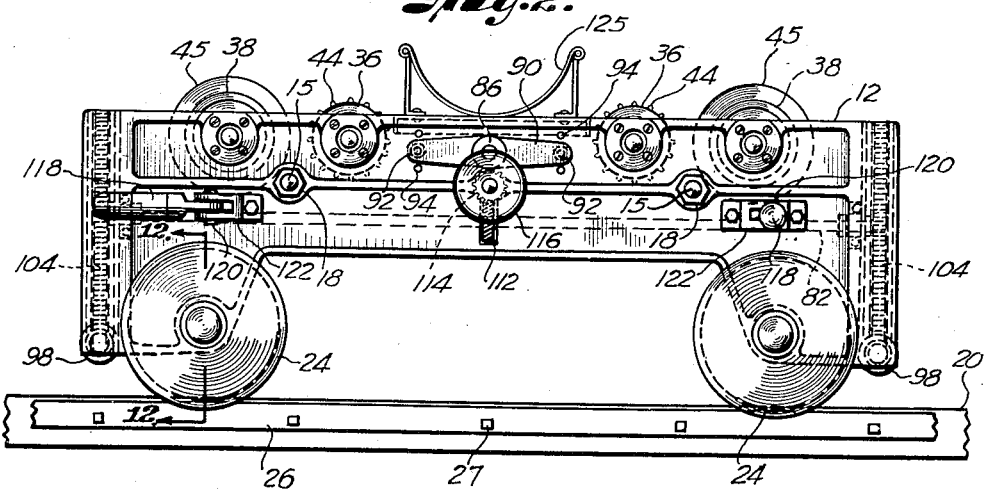

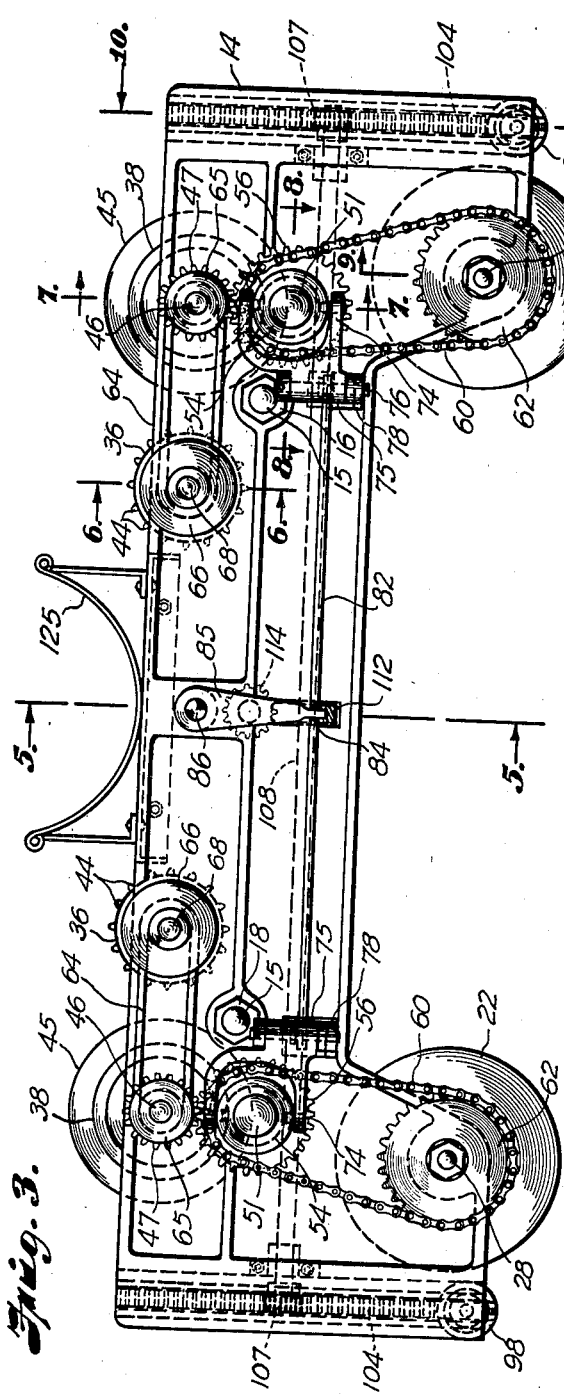
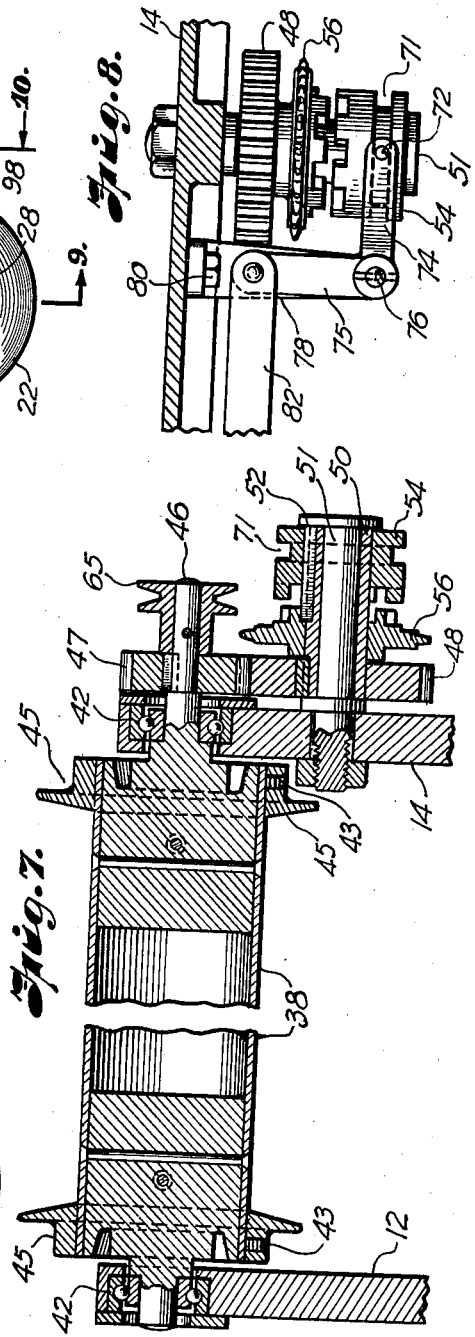

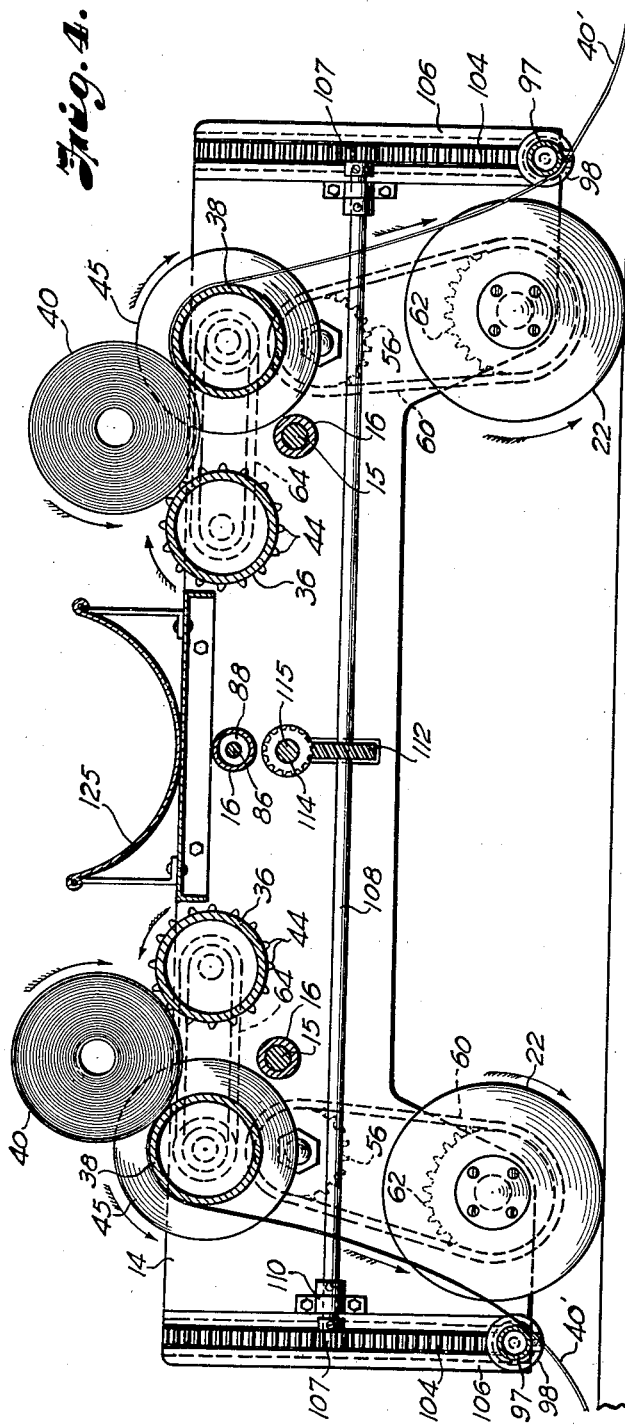

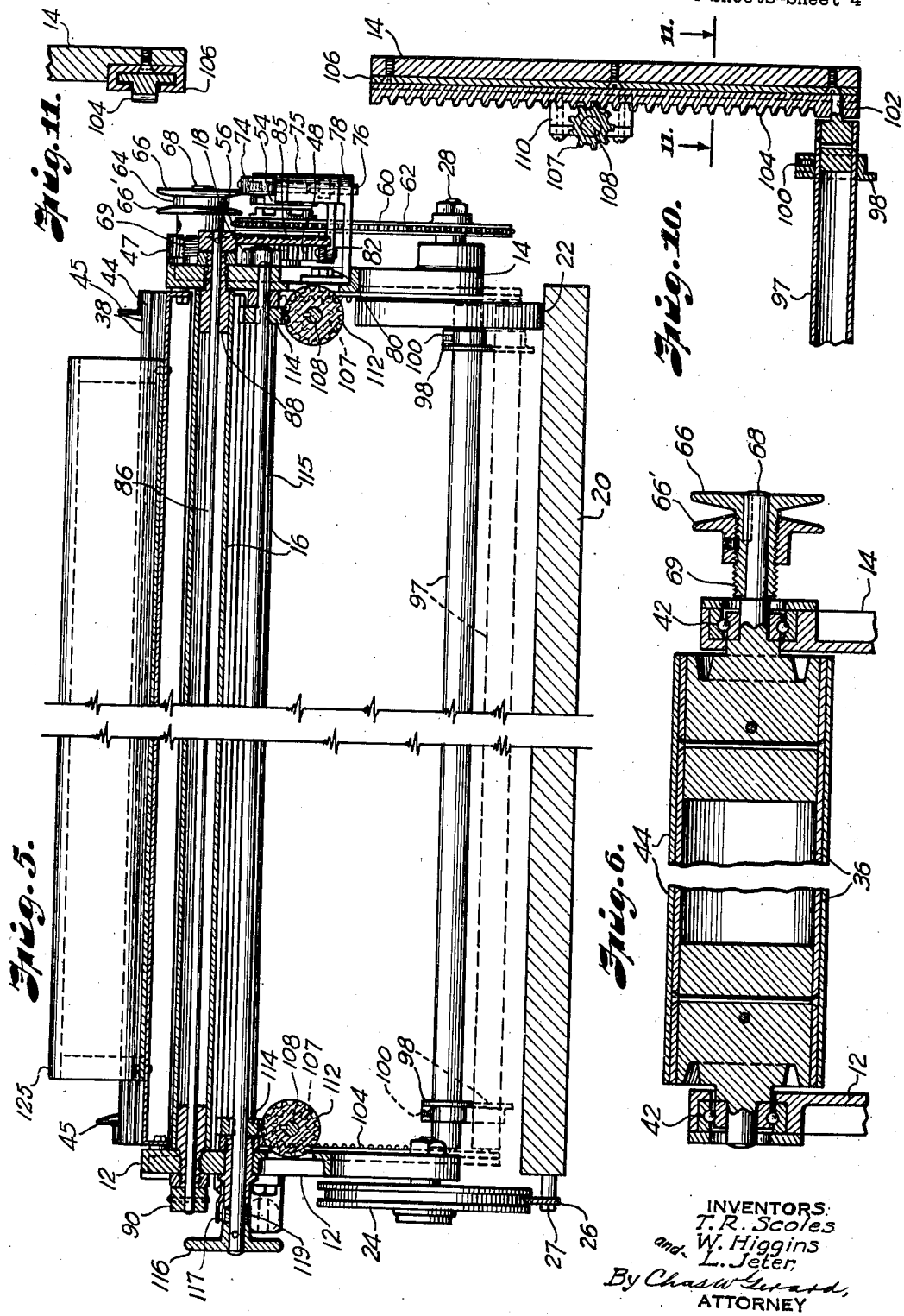

2,291,351

UNITED STATES PATENT OFFICE 2,291,351

APPARATUS FOR FEEDING AND SPREADING ROLL MATERIAL

Theodore R. Scoles, Walter Higgins, and Lyle Jeter, Kansas City, Mo.

Application November 25, 1940, Serial No. 367,050

7 Claims. (Cl. 270—31)

The present invention relates to apparatus for feeding and spreading material, such as cloth or the like, from rolls of such material, and depositing the material, as it is unrolled, in multiple layers (or stacks) upon a cutting table.

One of the primary objects of our invention is to provide a machine of this character whereby the material may be fed, or unrolled, and deposited in successive layers upon the cutting table without imposing any stretching pull or tension upon the goods or material.

For accomplishing this purpose we have devised an efficient form of apparatus to carry and transport rolls of the material back and forth along the cutting table while feeding said material in successive layers in each direction of travel, and effecting such feeding and spreading operation without pull or tension upon the goods—and with an even feeding action regardless of the diameter of the roll of the material.

It is also sought to provide an improved construction of apparatus in which the proper control for the feeding mechanism is arranged within easy reach of the operator as he moves the apparatus along the cutting table, and in which such control also provides for a shifting or reversal of the operation of the feeding action, according to the direction of travel of the apparatus.

It is further sought to devise an apparatus in which the desired operation may be carried out, regardless of the length of the roll of material, and in which efficient provision is also made for adjustable guiding means for the material as it is being laid or deposited in spread-out or cutting position upon the table.

With the foregoing general objects in view, the invention will now be described by reference to the accompanying drawings, wherein is illustrated one form of construction which we have devised for embodying the proposed improvements, after which those features and combinations deemed to be novel and patentable will be particularly set forth and claimed.

In the drawings—

Figure 1 is a plan view illustrating an apparatus constructed in accordance with the present invention;

Figure 2 is a side elevation of the same—on a larger scale;

Figure 3 is a side elevation of the opposite side of the machine, on a still larger scale;

Figure 4 is a similar view in longitudinal section (along the section line 4—4 of Figure 1), with rolls of material mounted in feeding position and arrows indicating the direction of feeding movements;

Figure 5 is a transverse sectional view, representing a section taken on the line 5—5 of Figure 3;

Figures 6 to 10 are enlarged sectional detail views, representing sections taken on the lines 6—6, 7—7, 8—8, 9—9 and 10—10, respectively, of Figure 3;

Figure 11 is a similar sectional detail view, being a section taken on the line 11—11 of Figure 10;

Figure 12 is an enlarged sectional view, being a section taken on the line 12—12 of Figure 2; and Figure 13 is a sectional view, representing a section taken on the line 13—13 of Figure 12.

In cloth feeding and spreading machines of the character to which the present invention relates, various objectionable features have characterized the results of the usual method of operation, in that a pull has been exerted upon the goods for the unwinding of the rolls, as required for the feeding operation, and this of course tends to stretch the material and place the goods under a certain amount of tension; and as this same degree of stretch or tension is not produced uniformly throughout the layers comprising the stack of material on the cutting table, there results an uneven effect of distortion throughout the successive layers and hence a uniform pattern can not be produced by the subsequent cutting operation.

It is our purpose to overcome these objectionable features of prior constructions by producing a machine in which the feeding and spreading operation is carried out with substantially no pull or stretching tension upon the goods from the time it leaves the roll of material until it is deposited upon the table for the cutting operation.

Referring now to the drawings in detail, the improved apparatus is illustrated as comprising a rolling carriage construction made up of side frame pieces 12 and 14 for the opposite sides of the machine, and connected together in spaced and parallel relation by means of tie rods 15, spacing sleeves 16 and clamping nuts 18 (see Figures 4 and 5). This carriage construction is designed for movement lengthwise over the top of a table 20 upon which the material is to be deposited, and accordingly the carriage is provided with wheels or rollers for rolling travel, such as a pair of plain-faced wheels 22 at one side of the carriage for resting on the top of the table 20 and a pair of grooved wheels 24 for travel along a track rail 26 which is anchored by means of bolts 27 or the like to one edge of the table, as illustrated in Figures 1 and 5. The spindles or axles 28 for the wheels 22 are preferably provided with ball bearings 30 (see Figure 9), while similar ball bearings 31 are interposed between the wheels 24 and their spindles or axles 32 and the latter carried in eccentric bushings 34 mounted in the frame member 12 (Figures 12 and 13), whereby the said spindles 32 may be readily adjusted for levelling the carriage into proper horizontal relation, and secured in that relation by set screws 33 and clamping nuts 35.

Duplicate roll supporting and feeding mechanisms are provided for the opposite ends of the machine, as illustrated in Figures 2 to 4. Each of these mechanisms comprises a pair of spaced rollers 36 and 38 for the support of a roll 40 of the cloth or like material which is to be unrolled and deposited on the table 20. These rollers 36 and 38 are of similar construction in that they are of cylindrical form, of approximately the same diameter, and provided with ball bearings 42 in the frame members 12 and 14—see Figures 6 and 7. The rollers 36, however, are fitted with longitudinal ribs or corrugations 44 to produce a fluted roll structure, to promote effective feeding engagement with the rolls 40 as well as to accommodate any looseness or puckering of the goods or material in the feeding action.

The ends of the rollers 38 are provided with collars 45 for guiding engagement with the ends of the rolls 40 of material, and said collars 45 may be adjusted or shifted lengthwise of the rollers 38 (see Figure 7) for accommodating different lengths of rolls 40—and secured in such adjusted relation by set screws 43.

At one side of the carriage the spindle 46 of each roller 38 is provided with a gear 47 meshing with another gear 48 keyed to a bushing 50 journaled on a stub shaft 51 mounted in the frame member 14. To each bushing 50 is also slidingly keyed (as indicated at 52) a clutch element 54, the teeth of which are adapted to be engaged with the teeth of a clutch sprocket 56 idly mounted on said bushing between said clutch element 54 and the adjacent gear 48—all as illustrated in Figure 7.

Each sprocket wheel 56 is engaged by a sprocket chain 60 which is also trained over a sprocket wheel 63 keyed to the outer end of the spindle of the corresponding wheel 22, as shown in Figure 9. Thus, as the wheels 22 travel along the table 20, their rotation imparts a driving action to the chains 60 and the sprocket wheels 56, and when either of said wheels is in driving or clutched engagement with its adjacent clutch element 54, the gears 48 and 47 are also rotated, thereby rotating the corresponding rollers 38 in a direction adapted to unroll the material from its roll 40, as indicated by the arrow in Figure 4. The adjacent roller 36 is also rotated in the same direction as the roller 38 by means of a V-belt 64 which connects a grooved pulley 65, secured to the outer end of the spindle 46, with another pulley 66 secured to the outer end of the spindle 68 of the roller 36; this latter pulley 66 is constructed with an adjustable section 66' threaded on its hub portion (as indicated at 69) whereby the grip on the belt 64 is varied in a conventional manner for correspondingly varying the drive to the roller 36 as may be required.

For the control of the clutch elements 54, the same are provided with annular grooves 71 for engagement with pins 72 carried by yokes 74 formed as parts of bell-crank levers 75 fulcrumed at 76 in brackets 78 attached by screws 80 to the outer side of the frame member 14 (see Figure 8.) The inner arms of the levers 75 are pivotally connected by a link 82 the mid-portion of which is formed with a recess or opening 84 for engagement by the lower end of an arm 85 attached to one end of a transverse shaft 86 which is journaled in bearings 88 in the opposite ends of the middle spacing sleeve 16 (see Figures 4 and 5). The opposite end of said shaft 86 (on the other side of the machine) is attached to the middle of an operating arm 90, the ends of which are provided with spring latch elements 92 for selective engagement with three separate latching points 94, whereby the arm 90 may be secured in neutral position as shown in Figure 2, or in either of two other feed-operating positions for clutching one or the other of the clutch elements 54 into driving relation with the corresponding material feeding and spreading mechanisms—only one of which is thus rendered operative at one time, according to the direction of travel of the machine.

At each end of the machine is provided a transverse guide rod or bar 97 for engaging and holding the material in proper spread relation as it is being fed and deposited upon the table; and suitably flanged collars 98 are adjustably secured, by set screws 100, to the opposite end portions of said rods 97, at a distance apart representing approximately the width of said material. As the operation continues, the successive layers of the material produce a stack of increasing height, so that it is necessary to gradually elevate the guide rods 97.

For this purpose the opposite ends of each of the rods 97 are journaled, as at 102, to the lower ends of rack bars 104 which are mounted for vertical sliding movement in channel members 106 attached to opposite corners of the carriage (see Figures 4, 10 and 11). Each pair of rack bars 104, at the same side of the machine, are engaged by pinions 107 carried by the opposite ends of a longitudinal shaft 108 which is mounted in bearings 110 on the inner side of the carriage, as clearly shown in Figures 4 and 5. To the middle portion of each shaft 108 is secured a worm gear 112, and each gear 112 is engaged by a similar gear 114 carried by a transverse shaft 115, the ends of which are journaled in the opposite sides of the carriage and one end provided with an operating handle 116 at the same side of the carriage as the clutch control member 90 and adjacent thereto. Thus, by operating the handle 116, the guide rods or bars 97 may be simultaneously adjusted and both raised or lowered the same extent to correspond to the operating conditions—as represented by dotted lines in Figure 5.

After such an adjustment the handle 116 and shaft 115 may be secured in their adjusted position by means of a latching spring 117 held in fixed position but adapted to engage a recessed collar 119 on said shaft, as illustrated in Figure 5.

The operator's side of the machine is also provided with a pair of handles 118, at opposite ends of the carriage, for the convenience of the operator in enabling him to push the machine along the table. Each of said handles is pivoted, at 120, within a bracket 122 attached to the carriage, whereby either handle may be swung outwardly into operative position, as illustrated at the right in Figure 1, or inwardly into inoperative position where it is entirely out of the way, as illustrated at the left in said Figure 1.

Mounted on top of the carriage, between the two sets of roll-supporting and feeding mechanisms, is secured a transverse trough-shaped receptacle 125, as shown, for receiving extra or spare rolls of the material, when desired.

In the operation of the machine, a roll 40 of the material is placed upon each pair of rollers 36 and 38, in the positions illustrated in Figure 4, and the ends of material 40' paid out over the rollers 38, and also (for starting the feeding action) down underneath the guide rods 97 and out on to the table 20. By adjustment of the handle 116 the said guide rods or bars 97 are lowered down to a suitable height above the table surface, for the spreading and the depositing of the first layers of the material.

With the drive to both the feeding mechanisms out of gear (which corresponds to the horizontal position of the clutch control arm 90 as represented in Figure 2), the machine is rolled to starting position to lay the end of the material 40' at the starting line on the table.

The apparatus is now ready to start operation in a direction toward the left, as indicated by the arrow at the middle of Figure 4, and accordingly the operator first pushes down the right hand end of the clutch control arm 90 in order to throw the right hand feeding mechanism in gear, and then swings out the right hand handle 118 by means of which he pushes the machine forward along the table.

In addition to supporting the roll 40, the rollers 36 and 38 of each feeding mechanism cooperate to impart an even and uniform feeding action to said roll 40 for unrolling the material therefrom, in which action the roller 36 operates by a pushing action to rotate the roll 40 counter-clockwise, while the roller 38 (being of substantially the same diameter as the roller 36) simply receives and discharges the material in a clockwise direction as fast as it is unwound from the roll 40 and allows it to trail and be deposited by gravity upon the table as the machine moves over the table surface.

The ribs or corrugations 44 on the roller 36, in addition to lending an appropriate gripping effect for carrying out said roll-pushing action, also afford spaces or clearances for any looseness or puckering in the goods, and thus tend to avoid undue wrinkling or creasing of the material.

It will thus be apparent that as the machine travels along the table, the material is simply deposited or spread upon the table surface without any pulling and consequent stretching of the goods, as happens in operations where a pulling upon the end of the material is relied upon to carry out the unwinding operation of the material off the roll. Such pulling and stretching of the material leaves it in a state of tension, and since the degree of tension thus produced can never be distributed throughout the material in anything like absolute uniformity in either the same layer or in successive layers of the material, this results in inequalities and distortions of the patterns or blanks that are produced by the subsequent cutting operation. Such objectionable results are completely eliminated by the operation of the present improved apparatus.

After one desired length of the material has been laid by the movement of the machine in one direction on the table, the operation is then reversed. The material is cut the required length, and movement of the machine may be reversed sufficiently to rewind some of the trailing cut end of the material—the operator having changed to the other handle 118, after throwing the one just used back into inoperative position. The operator then throws the other feeding mechanism at the other end of the machine into gear by pressing down the left hand end of the clutch control arm 90, and thereupon proceeds to push the machine down the table in the opposite direction for spreading another layer of the material from the other roll 40 and on top of the first layer—in the same manner as already described. This operation is of course carried out after properly positioning the machine for matching the end of the material from this second roll with the cut end of the first layer—for which purpose it may be necessary to shift the machine to some extent with both of the feeding mechanisms out of gear, as represented by the horizontal position of said clutch control arm.

The remaining steps of the operation are simply a repetition of the foregoing, the operator occasionally adjusting the handle 116 for raising the position of the guide rods or bars 97 to correspond to the increased height of the stack of layers of the material, as produced by the machine's operation.

It will therefore be apparent that we have devised a practical and efficient arrangement and construction of apparatus which is effective for carrying out all the desired objects of our improvements, but that the described construction may nevertheless be modified in various minor respects while still embodying the essential principles of our invention. We therefore desire to be understood as expressly reserving the right to make all such changes or modifications as may fairly be deemed to fall within the spirit or scope of our invention as defined by the following claims.

Having thus described our invention, what we claim and desire to secure by Letters Patent is:

1. Apparatus for unwinding and laying or spreading roll material, comprising a travelling carriage, a pair of spaced rollers mounted on said carriage and jointly supporting the roll of material, and means actuated by the travelling movement of the carriage to rotate said rollers and thereby feed the material and trail the same along the path of the carriage.

2. Apparatus for unwinding and laying or spreading material from rolls, comprising a travelling carriage, a pair of spaced rollers mounted on said carriage and jointly supporting the roll of material, one of said rollers being provided with longitudinal ribs or corrugations for engaging said roll and accommodating loose or puckered portions in said material, and means actuated by the travelling movement of the carriage to rotate said rollers and thereby feed the material and trail the same along the path of the carriage.

3. Apparatus for unwinding and laying or spreading material from rolls, comprising a travelling carriage, pairs of spaced rollers mounted on said carriage and each of said pairs jointly supporting a roll of the material, and means actuated by the travelling movement of the carriage in either direction to rotate one or the other of said pairs of rollers for feeding and trailing material from said rolls in the path of the carriage.

4. Apparatus for unwinding and laying or spreading material from rolls, comprising a travelling carriage a pair of spaced rollers mounted on said carriage and jointly supporting a roll of the material, driving means actuated by the travelling movement of the carriage to rotate said rollers and thereby feed the material and trail the same along the path of the carriage, and manually controlled means for disconnecting the drive to said rollers.

5. Apparatus for unwinding and laying or spreading material from rolls, comprising a travelling carriage, pairs of spaced rollers mounted on said carriage and each of said pairs jointly supporting a roll of the material, independent driving means actuated by the travelling movement of the carriage in either direction to rotate one or the other of said pairs of rollers for feeding and trailing material from said rolls in the path of the carriage, and manually controlled means for disconnecting the drive to either of said pairs of rollers.

6. Apparatus for unwinding and laying or spreading material from rolls, comprising a travelling carriage, means for supporting rolls of material and feeding the material therefrom at either end of said carriage, a guide bar at each end of the carriage for engaging and maintaining the material in a spread condition as it is trailed from the carriage, and manually controlled means for simultaneously raising or lowering said guide bars.

7. The method of unwinding and spreading material from rolls in opposite directions along a table, which consists in transporting a pair of rolls of the material back and forth along a table on which the material is to be deposited and alternately rotating said rolls, according to the direction of travel, for paying out the material from said rolls and trailing the material to form superposed layers or stacks of the material in an untensioned condition upon said table.

THEODORE R. SCOLES.
WALTER HIGGINS.
LYLE JETER.